US011103763B2

(12) United States Patent
Anton et al.

(10) Patent No.: US 11,103,763 B2
(45) Date of Patent: Aug. 31, 2021

(54) BASKETBALL SHOOTING GAME USING SMART GLASSES

(71) Applicant: Real Shot Inc., San Francisco, CA (US)

(72) Inventors: Paul Anton, Racine, WI (US); Michael Dykier, Rancho Cucamonga, CA (US)

(73) Assignee: Real Shot Inc., San Francisco, CA (US)

( * ) Notice: Subject to any disclaimer, the term of this patent is extended or adjusted under 35 U.S.C. 154(b) by 0 days.

(21) Appl. No.: 16/567,074

(22) Filed: Sep. 11, 2019

(65) Prior Publication Data

US 2020/0078658 A1 Mar. 12, 2020

Related U.S. Application Data

(60) Provisional application No. 62/729,532, filed on Sep. 11, 2018.

(51) Int. Cl.
*A63B 71/06* (2006.01)
*A63B 24/00* (2006.01)
*A63B 67/00* (2006.01)
*A63B 69/00* (2006.01)

(52) U.S. Cl.
CPC ...... *A63B 71/0622* (2013.01); *A63B 24/0006* (2013.01); *A63B 24/0021* (2013.01); *A63B 67/002* (2013.01); *A63B 69/0071* (2013.01); *A63B 2024/0025* (2013.01); *A63B 2024/0028* (2013.01); *A63B 2024/0096* (2013.01); *A63B 2071/0666* (2013.01)

(58) Field of Classification Search
None
See application file for complete search history.

(56) References Cited

U.S. PATENT DOCUMENTS

| | | |
|---|---|---|
| 6,805,490 B2 | 10/2004 | Levola |
| 7,094,164 B2 | 8/2006 | Marty et al. |
| 7,181,108 B2 | 2/2007 | Levola |
| 7,184,615 B2 | 2/2007 | Levola |
| 7,206,107 B2 | 4/2007 | Levola |
| 7,483,604 B2 | 1/2009 | Levola |
| 7,764,413 B2 | 7/2010 | Levola |
| 7,850,552 B2 | 12/2010 | Marty et al. |
| 7,854,669 B2 | 12/2010 | Marty et al. |
| 8,160,411 B2 | 4/2012 | Levola et al. |
| 8,194,325 B2 | 6/2012 | Levola et al. |
| 8,254,031 B2 | 8/2012 | Levola |
| 8,314,993 B2 | 11/2012 | Levola |
| 8,320,032 B2 | 11/2012 | Levola |
| 8,360,578 B2 | 1/2013 | Nummela |
| 8,408,982 B2 | 4/2013 | Marty et al. |
| 8,409,024 B2 | 4/2013 | Marty et al. |
| 8,466,953 B2 | 6/2013 | Levola |
| 8,477,046 B2 | 7/2013 | Alonso |
| 8,494,229 B2 | 7/2013 | Jarvenpaa et al. |
| 8,508,848 B2 | 8/2013 | Saarikko |

(Continued)

*Primary Examiner* — Jwalant Amin
(74) *Attorney, Agent, or Firm* — Boyle Fredrickson, SC (57) ABSTRACT

The present invention relates to a basketball shooting game played using smart glasses, and more specifically, to a real-time basketball shooting game that enables at least two players at basketball courts at remote locations anywhere in the world to play a real basketball shooting game with one another using smart glasses.

20 Claims, 8 Drawing Sheets

(56) References Cited

U.S. PATENT DOCUMENTS

| | | |
|---|---|---|
| 8,547,638 B2 | 10/2013 | Levola |
| 8,593,734 B2 | 11/2013 | Laakkonen |
| 8,617,008 B2 | 12/2013 | Marty et al. |
| 8,622,832 B2 | 1/2014 | Marty et al. |
| 8,717,392 B2 | 5/2014 | Levola |
| 8,774,467 B2 | 7/2014 | Ryan |
| 8,830,584 B2 | 9/2014 | Saarikko et al. |
| 8,908,922 B2 | 12/2014 | Marty et al. |
| 8,913,324 B2 | 12/2014 | Schrader |
| 8,948,457 B2 | 2/2015 | Marty et al. |
| 8,950,867 B2 | 2/2015 | Macnamara |
| 9,086,568 B2 | 7/2015 | Jarvenpaa |
| 9,215,293 B2 | 12/2015 | Miller |
| 9,238,165 B2 | 1/2016 | Marty et al. |
| 9,283,431 B2 | 3/2016 | Marty et al. |
| 9,283,432 B2 | 3/2016 | Marty et al. |
| 9,310,559 B2 | 4/2016 | Macnamara |
| 9,345,929 B2 | 5/2016 | Marty et al. |
| 9,348,143 B2 | 5/2016 | Gao et al. |
| D758,367 S | 6/2016 | Natsume |
| 9,358,455 B2 | 6/2016 | Marty et al. |
| 9,370,704 B2 | 6/2016 | Marty |
| 9,389,424 B1 | 7/2016 | Schowengerdt |
| 9,390,501 B2 | 7/2016 | Marty et al. |
| 9,417,452 B2 | 8/2016 | Schowengerdt et al. |
| 9,429,752 B2 | 8/2016 | Schowengerdt et al. |
| 9,470,906 B2 | 10/2016 | Kaji et al. |
| 9,541,383 B2 | 1/2017 | Abovitz et al. |
| 9,547,174 B2 | 1/2017 | Gao et al. |
| 9,612,403 B2 | 4/2017 | Abovitz et al. |
| 9,651,368 B2 | 5/2017 | Abovitz et al. |
| 9,671,566 B2 | 6/2017 | Abovitz et al. |
| 9,694,238 B2 | 7/2017 | Marty et al. |
| 9,697,617 B2 | 7/2017 | Marty et al. |
| D795,952 S | 8/2017 | Natsume |
| 9,726,893 B2 | 8/2017 | Gao et al. |
| 9,734,405 B2 | 8/2017 | Marty et al. |
| 9,740,006 B2 | 8/2017 | Gao |
| D796,503 S | 9/2017 | Natsume et al. |
| D796,504 S | 9/2017 | Natsume et al. |
| D796,505 S | 9/2017 | Natsume et al. |
| D796,506 S | 9/2017 | Natsume et al. |
| D797,735 S | 9/2017 | Fraser et al. |
| D797,743 S | 9/2017 | Awad et al. |
| D797,749 S | 9/2017 | Awad et al. |
| 9,753,286 B2 | 9/2017 | Gao et al. |
| 9,753,297 B2 | 9/2017 | Saarikko et al. |
| 9,761,055 B2 | 9/2017 | Miller |
| 9,766,381 B2 | 9/2017 | Jarvenpaa et al. |
| 9,766,703 B2 | 9/2017 | Miller |
| 9,767,616 B2 | 9/2017 | Miller |
| 9,791,700 B2 | 10/2017 | Schowengerdt |
| 9,804,397 B2 | 10/2017 | Schowengerdt et al. |
| 9,830,522 B2 | 11/2017 | Mazur et al. |
| 9,832,437 B2 | 11/2017 | Kass et al. |
| 9,841,601 B2 | 12/2017 | Schowengerdt |
| 9,844,704 B2 | 12/2017 | Thurman et al. |
| 9,846,306 B2 | 12/2017 | Schowengerdt |
| 9,846,967 B2 | 12/2017 | Schowengerdt |
| 9,851,563 B2 | 12/2017 | Gao et al. |
| 9,852,548 B2 | 12/2017 | Greco et al. |
| 9,857,170 B2 | 1/2018 | Abovitz et al. |
| 9,857,591 B2 | 1/2018 | Welch et al. |
| 9,874,749 B2 | 1/2018 | Bradski et al. |
| 9,874,752 B2 | 1/2018 | Gao et al. |
| 9,881,420 B2 | 1/2018 | Miller |
| 9,886,624 B1 | 2/2018 | Marty et al. |
| 9,889,367 B2 | 2/2018 | Minkovitch |
| 9,891,077 B2 | 2/2018 | Kaehler |
| 9,904,058 B2 | 2/2018 | Yeoh et al. |
| 9,911,233 B2 | 3/2018 | O'Connor et al. |
| 9,911,234 B2 | 3/2018 | Miller |
| 9,915,824 B2 | 3/2018 | Schowengerdt et al. |
| 9,915,826 B2 | 3/2018 | Tekolste et al. |
| 9,922,462 B2 | 3/2018 | Miller |
| 9,928,654 B2 | 3/2018 | Miller |
| 9,939,643 B2 | 4/2018 | Schowengerdt |
| 9,946,071 B2 | 4/2018 | Schowengerdt |
| 9,948,874 B2 | 4/2018 | Kaehler |
| 9,952,042 B2 | 4/2018 | Abovitz et al. |
| 9,972,132 B2 | 5/2018 | O'Connor et al. |
| 9,978,182 B2 | 5/2018 | Yeoh et al. |
| 9,984,506 B2 | 5/2018 | Miller |
| 9,990,777 B2 | 6/2018 | Bradski |
| 9,996,977 B2 | 6/2018 | O'Connor et al. |
| 10,008,038 B2 | 6/2018 | Miller |
| 10,010,778 B2 | 7/2018 | Marty et al. |
| 10,013,806 B2 | 7/2018 | O'Connor et al. |
| 10,015,477 B2 | 7/2018 | Grata et al. |
| 10,021,149 B2 | 7/2018 | Miller |
| 10,042,097 B2 | 8/2018 | Tekolste |
| 10,042,166 B2 | 8/2018 | Yeoh et al. |
| 10,043,312 B2 | 8/2018 | Miller et al. |
| 10,048,501 B2 | 8/2018 | Gao et al. |
| 10,060,766 B2 | 8/2018 | Kaehler |
| 10,061,130 B2 | 8/2018 | Gao et al. |
| 10,068,374 B2 | 9/2018 | Miller et al. |
| 10,073,267 B2 | 9/2018 | Tekolste et al. |
| 10,073,272 B2 | 9/2018 | Kaji et al. |
| 10,078,919 B2 | 9/2018 | Powderly et al. |
| 10,089,453 B2 | 10/2018 | Kaehler |
| 10,089,526 B2 | 10/2018 | Amayeh et al. |
| 10,092,793 B1 | 10/2018 | Marty et al. |
| 10,100,154 B2 | 10/2018 | Bhagat |
| 10,101,802 B2 | 10/2018 | Abovitz |
| 10,109,061 B2 | 10/2018 | Bose et al. |
| 10,109,108 B2 | 10/2018 | Miller et al. |
| 10,115,232 B2 | 10/2018 | Miller et al. |
| 10,115,233 B2 | 10/2018 | Miller et al. |
| 10,126,812 B2 | 11/2018 | Miller et al. |
| 10,127,369 B2 | 11/2018 | Kaehler |
| 10,127,723 B2 | 11/2018 | Miller |
| 10,134,186 B2 | 11/2018 | Schowengerdt et al. |
| D836,105 S | 12/2018 | Natsume et al. |
| D836,106 S | 12/2018 | Natsume et al. |
| D836,107 S | 12/2018 | Natsume et al. |
| D836,108 S | 12/2018 | Natsume et al. |
| D836,109 S | 12/2018 | Natsume et al. |
| D836,630 S | 12/2018 | Natsume et al. |
| D836,631 S | 12/2018 | Natsume et al. |
| D836,632 S | 12/2018 | Natsume et al. |
| D836,633 S | 12/2018 | Natsume et al. |
| D836,634 S | 12/2018 | Natsume et al. |
| 10,146,997 B2 | 12/2018 | Kaehler |
| 10,151,875 B2 | 12/2018 | Schowengerdt et al. |
| 10,156,722 B2 | 12/2018 | Gao et al. |
| 10,156,725 B2 | 12/2018 | TeKolste et al. |
| 10,162,184 B2 | 12/2018 | Gao et al. |
| 10,163,010 B2 | 12/2018 | Kaehler et al. |
| 10,163,011 B2 | 12/2018 | Kaehler et al. |
| 10,163,265 B2 | 12/2018 | Miller et al. |
| 10,175,478 B2 | 1/2019 | Tekolste et al. |
| 10,175,491 B2 | 1/2019 | Gao et al. |
| 10,175,564 B2 | 1/2019 | Yaras |
| 10,176,639 B2 | 1/2019 | Schowengerdt et al. |
| 10,180,734 B2 | 1/2019 | Miller et al. |
| 10,185,147 B2 | 1/2019 | Lewis |
| 10,186,082 B2 | 1/2019 | Min et al. |
| 10,186,085 B2 | 1/2019 | Greco et al. |
| 10,191,294 B2 | 1/2019 | Macnamara |
| 10,198,864 B2 | 2/2019 | Miller |
| 10,203,762 B2 | 2/2019 | Bradski et al. |
| 10,210,471 B2 | 2/2019 | King et al. |
| 10,228,242 B2 | 3/2019 | Abovitz et al. |
| 10,234,687 B2 | 3/2019 | Welch et al. |
| 10,234,939 B2 | 3/2019 | Miller et al. |
| 10,237,540 B2 | 3/2019 | Welch et al. |
| 10,241,263 B2 | 3/2019 | Schowengerdt et al. |
| D845,296 S | 4/2019 | Natsume et al. |
| D845,297 S | 4/2019 | Natsume et al. |
| 10,249,087 B2 | 4/2019 | Wei et al. |
| 10,254,454 B2 | 4/2019 | Wei et al. |
| 10,254,483 B2 | 4/2019 | Schowengerdt et al. |
| 10,254,536 B2 | 4/2019 | Yeoh et al. |

(56) References Cited

U.S. PATENT DOCUMENTS

| | | |
|---|---|---|
| 10,255,529 B2 | 4/2019 | Rabinovich et al. |
| 10,260,864 B2 | 4/2019 | Edwin et al. |
| 10,261,162 B2 | 4/2019 | Bucknor et al. |
| 10,261,318 B2 | 4/2019 | TeKolste et al. |
| 10,262,462 B2 | 4/2019 | Miller et al. |
| 10,267,970 B2 | 4/2019 | Jones, Jr. et al. |
| 10,275,902 B2 | 4/2019 | Bradski |
| 10,282,611 B2 | 5/2019 | Amayeh et al. |
| 10,282,907 B2 | 5/2019 | Miller et al. |
| 10,288,419 B2 | 5/2019 | Abovitz et al. |
| 10,295,338 B2 | 5/2019 | Abovitz et al. |
| 10,296,792 B2 | 5/2019 | Spizhevoy et al. |
| 10,302,957 B2 | 5/2019 | Sissom |
| 10,304,246 B2 | 5/2019 | Schowengerdt et al. |
| 10,306,213 B2 | 5/2019 | Sissom et al. |
| D850,103 S | 6/2019 | Natsume et al. |
| 10,313,639 B2 | 6/2019 | Wei |
| 10,313,661 B2 | 6/2019 | Kass |
| 10,317,690 B2 | 6/2019 | Cheng |
| 10,332,315 B2 | 6/2019 | Samec et al. |
| 10,337,691 B2 | 7/2019 | Kaehler et al. |
| 10,338,391 B2 | 7/2019 | Yeoh et al. |
| 10,343,015 B2 | 7/2019 | Marty et al. |
| 10,345,590 B2 | 7/2019 | Samec et al. |
| 10,345,591 B2 | 7/2019 | Samec et al. |
| 10,345,592 B2 | 7/2019 | Samec et al. |
| 10,345,593 B2 | 7/2019 | Samec et al. |
| 10,352,693 B2 | 7/2019 | Abovitz et al. |
| 10,359,631 B2 | 7/2019 | Samec et al. |
| 10,359,634 B2 | 7/2019 | Yeoh et al. |
| 10,360,685 B2 | 7/2019 | Marty et al. |
| 10,365,488 B2 | 7/2019 | Samec et al. |
| 10,371,876 B2 | 8/2019 | Menezes et al. |
| 10,371,896 B2 | 8/2019 | Yeoh et al. |
| 10,371,945 B2 | 8/2019 | Samec et al. |
| 10,371,946 B2 | 8/2019 | Samec et al. |
| 10,371,947 B2 | 8/2019 | Samec et al. |
| 10,371,948 B2 | 8/2019 | Samec et al. |
| 10,371,949 B2 | 8/2019 | Samec et al. |
| 10,378,882 B2 | 8/2019 | Yeoh et al. |
| 10,378,930 B2 | 8/2019 | Kaehler |
| 10,379,350 B2 | 8/2019 | Samec et al. |
| 10,379,351 B2 | 8/2019 | Samec et al. |
| 10,379,353 B2 | 8/2019 | Samec et al. |
| 10,379,354 B2 | 8/2019 | Samec et al. |
| 2005/0143154 A1 | 6/2005 | Bush |
| 2008/0015061 A1* | 1/2008 | Klein ................ G09B 19/0038 473/447 |
| 2009/0147992 A1* | 6/2009 | Tong ................ G06K 9/00335 382/103 |
| 2013/0095924 A1 | 4/2013 | Geisner et al. |
| 2015/0382076 A1* | 12/2015 | Davisson ............. H04N 21/435 725/62 |
| 2017/0072283 A1* | 3/2017 | Davisson ............... A63B 43/00 |
| 2019/0087661 A1 | 3/2019 | Lee et al. |
| 2019/0392729 A1* | 12/2019 | Lee .................... G06K 9/00724 |

* cited by examiner

BASKETBALL SHOOTING GAME USING SMART GLASSES

This application claims the benefit of U.S. Provisional Application No. 62/729,532 filed on Sep. 11, 2018.

BACKGROUND

The game of basketball is a competitive sport immensely popular worldwide. It is played professionally, collegiately, in high schools, middle schools and elementary schools, and among friends and family as well as individually. The game of basketball may be played in numerous ways, and, for example, may take the form of an organized game between teams, a pickup game at a local park, or a game of HORSE in one's driveway.

Athletes often spend numerous hours practicing and training in order to improve their skill level so they can become more competitive in the game of basketball. In an effort to assist athletes in improving their skill level, systems have been developed that track an athlete's performance while training or playing, and then provide feedback to the athlete indicative of the performance which can be analyzed and evaluated to help the athlete improve one's skill level.

Game systems have a different focus which is primarily directed toward enhancing the recreational aspect of basketball. Such game systems may involve shooting competitions between family members and/or friends at one location.

SUMMARY

In one aspect of the invention, a basketball shooting game method for at least two basketball players on basketball courts at remote locations is provided. The method includes the steps of matching up two players at remote locations that have selected to play the same basketball shooting game, acquiring real-time camera data from smart glasses that each player wears while the players are playing the selected basketball shooting game, analyzing the camera data to determine make/miss data for each player based upon how many shots each player made and missed during the selected basketball game and communicating the camera data and the make/miss data of one player to the other player.

In another aspect of the invention, a method for enabling two basketball players on basketball courts at remote locations to play a selected basketball game against one another is provided. The method includes the steps of matching up two basketball players on basketball courts at remote locations to play a selected basketball shooting same, transmitting the real-time camera data from smart glasses worn by each player to a smart device of the other player, analyzing the data from each player's smart glasses to determine how many shots each player made and missed during the selected basketball game and transmitting the number of shots made and missed by each player to the other player's smart device.

In another aspect of the invention, a method for enabling two basketball players on basketball courts at remote locations to play a selected basketball shooting game against one another is provided. The method includes the steps of matching up two players to play a selected basketball shooting same, transmitting the real-time camera data from smart glasses worn by each player to a smart device of the other player, analyzing the data from each player's smart glasses to recognize the basketball rim and backboard, analyzing the data from each player's smart glasses to determine each player's position on their basketball court, analyzing the data from each player's smart glasses to track the basketball, analyzing the data from each player's smart glasses to determine if each shot taken by each player was a make or miss without the need for sensors on the basketball, rim or backboard, displaying augmented reality information related to the selected basketball game on each player's smart glasses and transmitting the number of shots made and missed by each player to both players smart devices.

Before any embodiments of the invention are explained in detail, it is to be understood that the invention is not limited in its application to the details of constructions and the arrangement of components set forth in the following description or illustrated in the drawings. The invention is capable of other embodiments and of being practiced or of being carried out in various ways.

DETAILED DESCRIPTION

Figure 1:
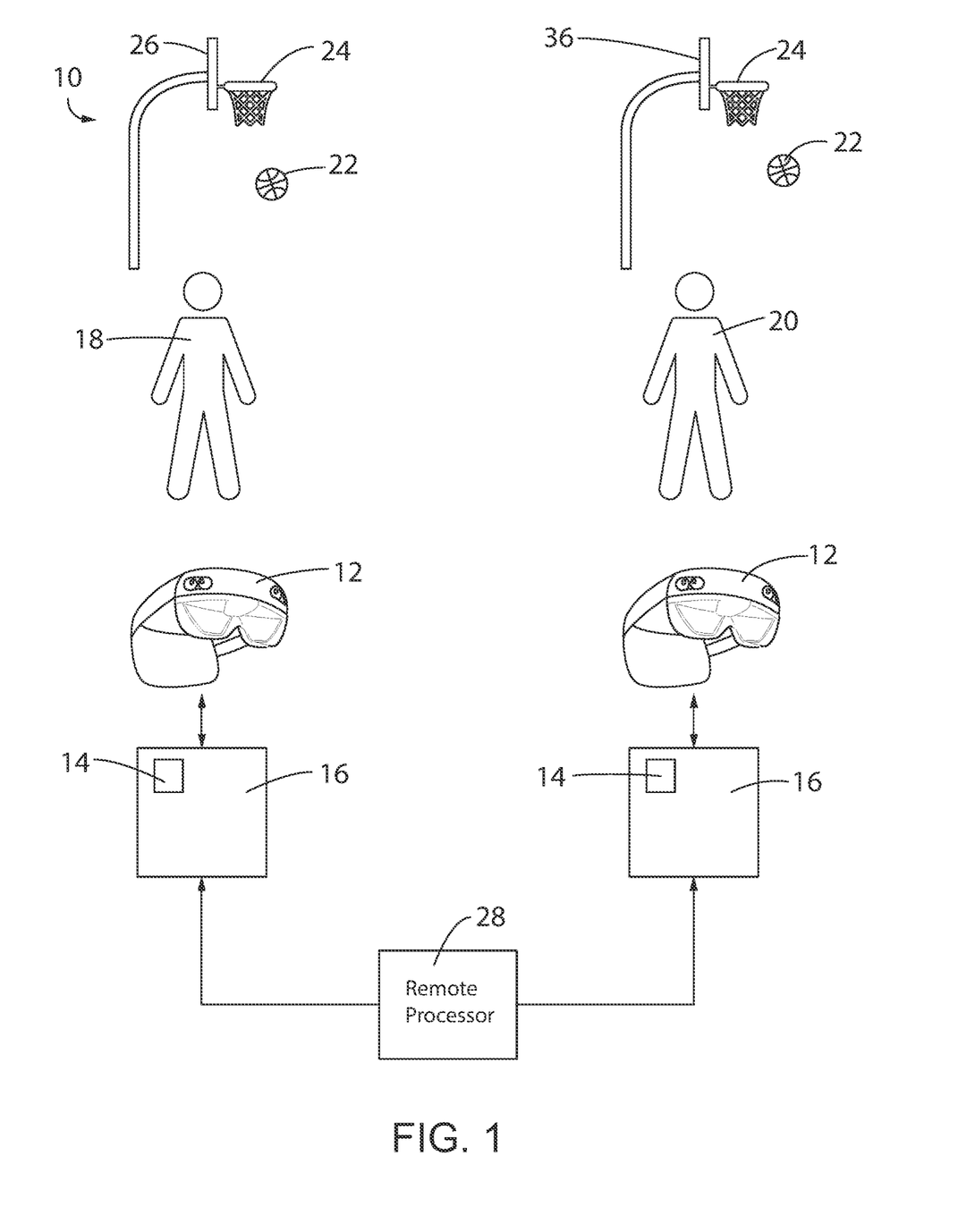
FIG. 1 is a schematic view of one embodiment of the invention.

FIG. 1 illustrates one embodiment of a basketball shooting game system 10 in accordance with the present invention. The system 10 preferably includes smart glasses 12 and an application 14 running on a smart device 16 for each game player 18 and 20. The smart device 16 is preferably a mobile phone or tablet, but other devices can also be utilized. Alternatives to the application 14 running on a smart device 16 can also be utilized, such as a dedicated computer with software loaded thereon. The system 10 enables the playing of a real-time basketball shooting game between at least two players 18 and 20 on basketball courts at remote locations anywhere in the world. The game is played on a physical basketball court, whether at a gym, a park, or a backyard, and played in connection with a conventional basketball 22, a rim 24 and backboard 26. Each player 18 and 20 wears smart glasses 12 that analyze and process data and that communicate with the player's device 16. The device 16 receives and processes the data from each player's smart glasses 12 and communicates with a remote processor 28. The smart glasses 12 provide camera data, track the position of the player 18 or 20, recognize the basketball 22 and basketball backboard 26 in use by each player 18 or 20 and will detect each player's shooting makes/misses so there is no need for additional sensors on the basketball rim 24, the backboard 26, or the basketball 22.

Figure 3:
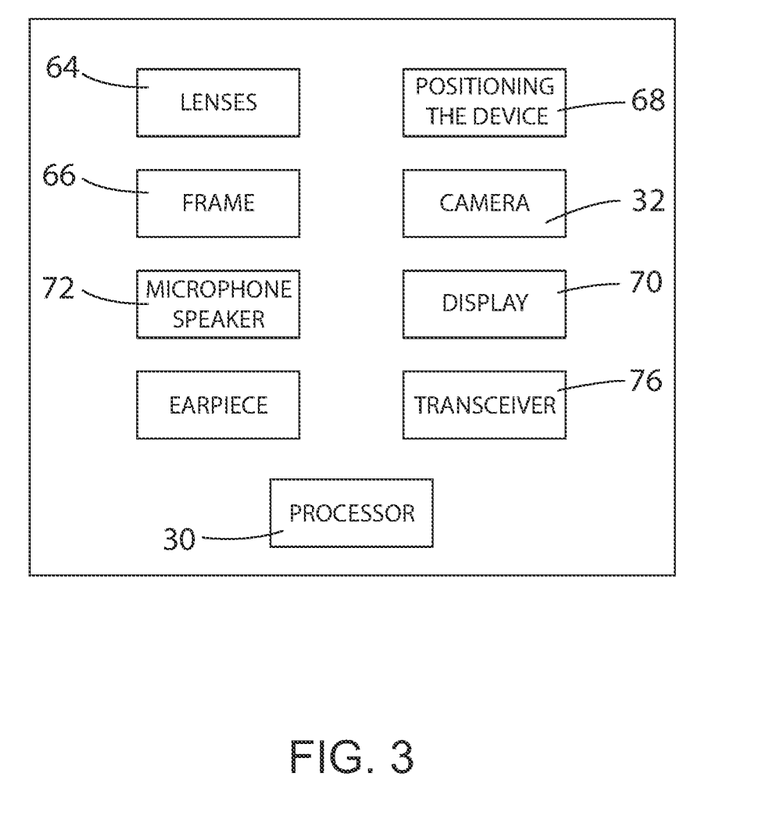
FIG. 3 is a schematic view of smart glass of the invention.
Figure 7:
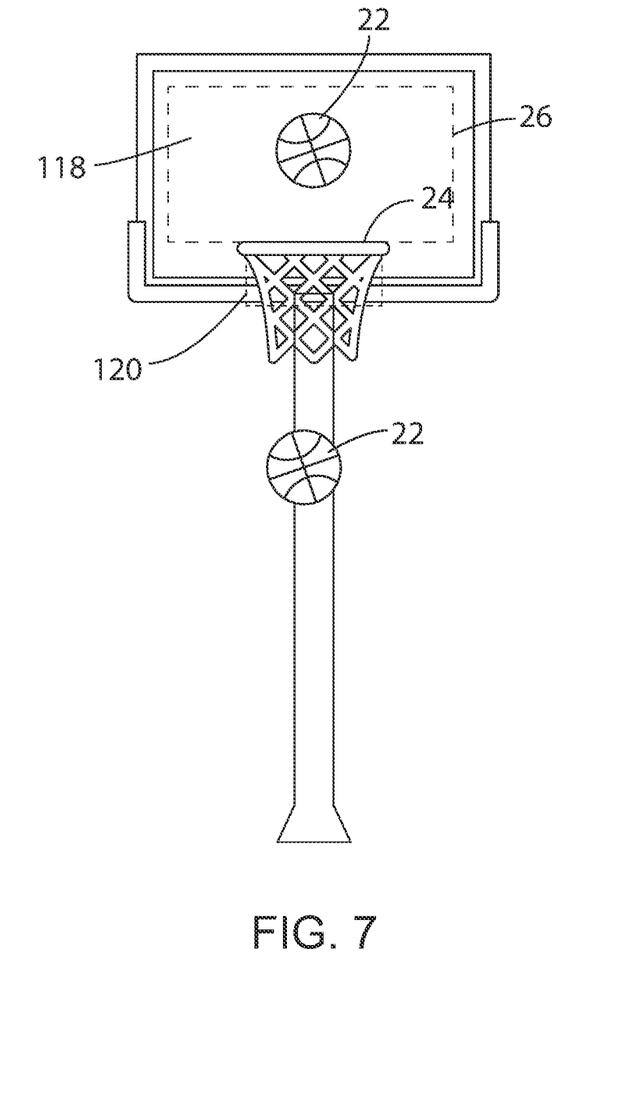
FIG. 7 is a schematic of the collision detection boxes of the make/miss analysis.
Figure 8:
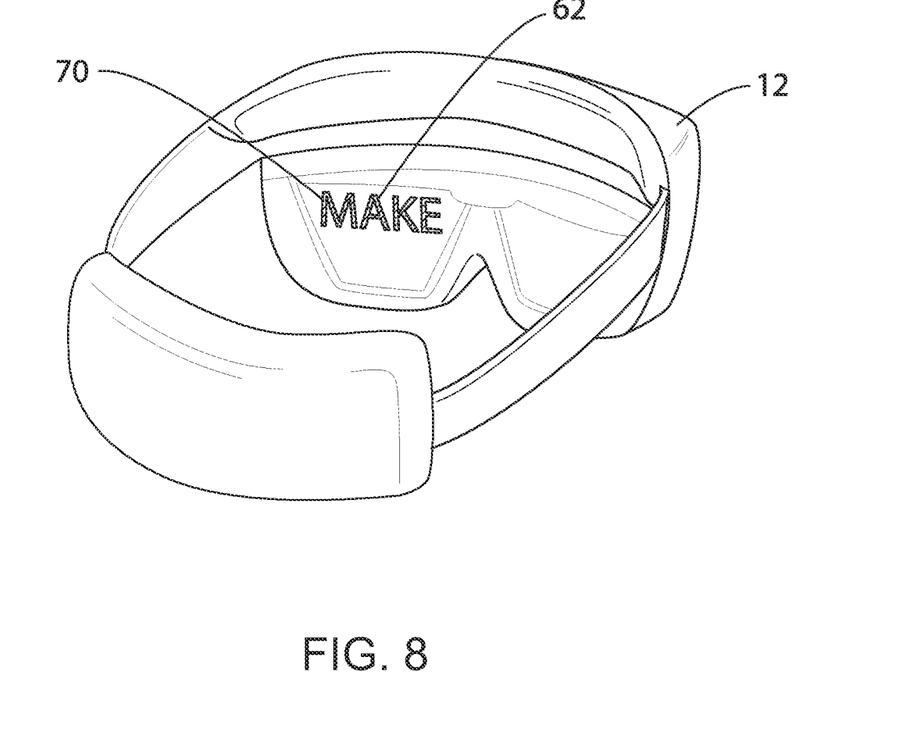
FIG. 8 is an illustration of the display on the smart glasses showing an augmented reality graphic.

The smart glasses 12 worn by each player 18 and 20 include a processor 30 and a camera 32, as is shown in FIG. 3 and as will be discussed in detail below, so that the second player 20 at the remote location from the first player 18 can see everything the first player 18 sees. Real-time image, video and data are communicated to both players 18 and 20 such as by being transmitted from the first player's glasses 12 to the first player's device 16 as well as to the second player's device 16. Every time one player makes a shot, a green make will appear on the other player's device 16 and every time one player misses a shot, a red miss will be shown on the other player's device 16. The make/miss data of each player 18 and 20 are also displayed on that player's smart glasses 12, as is shown in FIG. 7 and as will be discussed in more detail below, along with other data such as location, temperature, and distance from the basketball rim. The smart glasses 12 include built in communication so that two players 18 and 20 playing against each other can talk to one another while playing the game as well as listen to music.

Figure 2:
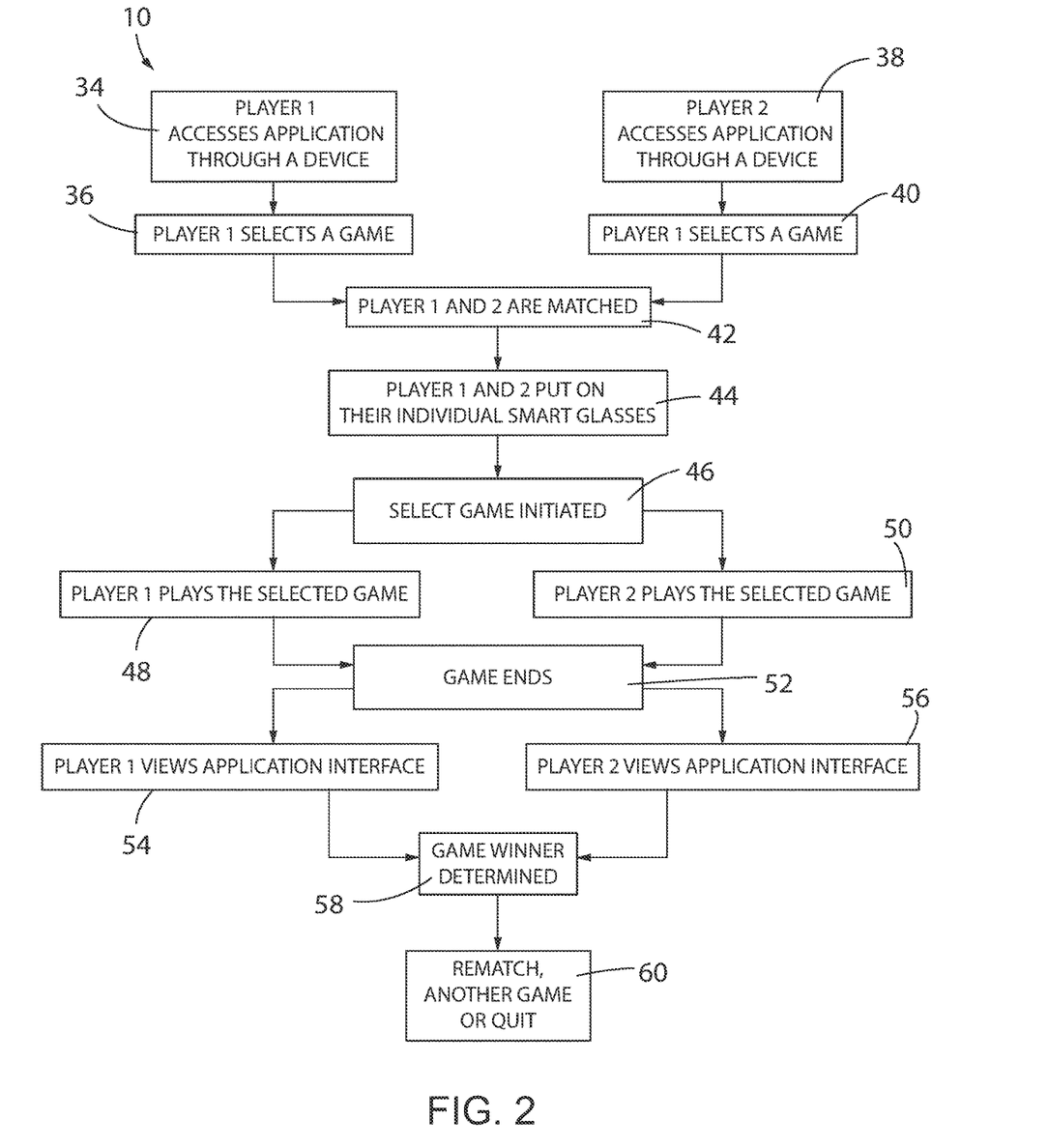
FIG. 2 is a flowchart of a basketball game being played by two players at basketball courts in remote locations utilizing the invention.

An example of a basketball shooting game utilizing the invention is as follows and as shown in FIG. 2. A first player 18 logs into the application 14 on the first player's device 16 at step 34. The first player 18 selects a particular game from a list of options such as, for example, a three-point competition or a free-throw competition at step 36. The first player 10 is then matched up with a second player 20 at a basketball court in a remote location who also is logged into the application 14 on the second player's device 16 and who is interested in playing the same game at steps 38, 40, 42. Once both players 18 and 20 are matched and the game determined, the players 18 and 20 put on their individual smart glasses 12 so that the camera 32 is activated and each player 18 and 20 can see what the other player sees on the basketball court at step 44. The players 18 and 20 then set aside their individual devices 16 such as in their pocket, on a chair, on a fence, or any other convenient location that is nearby so they can then begin the selected shooting game at step 46. Both players 18 and 20 can play the selected game at the same time as shown in steps 48 and 50 or they can play one at a time while watching the other player on their device 16. If the players 18 and 20 play the selected game one at a time, each player 18 and 20 can monitor the current data and scores of the other player as well as make/miss data of the other player on their device 16. The application 14 can also provide for replays of each player's shots if desired. The application 14 also provides a timer and a game end alarm if the selected game requires one.

The images, video as well as other data collected and processed by player's glasses 12 is communicated to the other player such as be being wirelessly transmitted to the player's respective device 16 which is also communicated to the other player's device 16 as is known in the art. With this system 10, the capture of images, video and data by the glasses 12 of the first player 18 at one basketball court location can be viewed in real-time by the second player 18 at a remote basketball court location and vice versa thus enabling the play of basketball games by one player 18 against another player 20 anywhere in the world.

After the selected game is completed at step 52, each player 18 and 20 can go back to their device 16 at steps 54 and 56 to view their own scores and data, to view the other player's scores and data and to review which player 18 or 20 won the game at step 58. Each player 18 and 20 can then set up a rematch, proceed to another opponent or game or quit at step 60.

It should be noted that in the above example, two players 18 and 20 are matched up and playing the selected game against each other. However, the invention can be scaled so that any number of players can play against one another if each player has smart glasses and a device to access the application.

In another example of the system 10, indicia and/or graphics 62 can be projected by the glasses 12, as is shown in FIG. 7 and as will be discussed in detail below, to augment reality in addition to showing the make/miss data. For example, a player 18 or 20 could see a famous basketball player in their field of view and be required to take a basketball shot while seeing the famous player. In another example, graphics of basketball stadiums and fans can be added to make a player's current location look like they are playing in a large arena. In another example, graphics can be added to the ball itself, as if the ball were of fire, or the court itself, as if the court were in a tundra of snow.

Turning now to FIG. 3, an exemplary component design for the smart glasses 12 is shown. The glasses 12 can be commercially available smart glasses, such as HoloLens 2 available from Microsoft Corporation, with no additional hardware added. Alternatively, the glasses 12 can be custom designed and manufactured with the needed components. It should be noted that almost any pair of commercially available smart glasses will work in this system 10.

The glasses 12 include right and left lenses 64 on a wearable frame 66. The lenses 64 allow natural light in thus allowing the wearer to see the real world. The field of view (FOV) of most lenses 64 is preferably in the range of 30 degrees to 180 degrees. A positioning device 68 is mounted on the frame 66 and functions to determine a physical location of the wearer. The positioning device 68 may include both a geographic locator such as a GPS device known in the art that utilizes signals from GPS satellites to determine the current position of a player 18 or 20 as well as orientation devices such as known accelerometers and 3-axis gravity detectors that determine the direction the player 18 or 20 is looking while wearing the glasses 12. The camera 32 is mounted to the frame 66 and captures images and video in the FOV. A display 70 is mounted on the frame 66 spaced in front of one or both lenses 64. The display 70 is preferably a small video screen such as a micro-LED display that the player 18 or 20 looks directly at or is a projection device that displays information such as images, video, and other data onto one of both lenses 64. For example, every time a player 18 or 20 makes a shot, a green MAKE will show on the display 70 in real-time, and every time the player 18 or 20 misses a shot, a red MISS will show on the display 70 in real time. The display 70 functions to overlay such information and/or graphics onto a user's FOV such that what a player 18 or 20 is seeing through the lenses 64 is augmented with the overlaid information 62 thus providing an augmented reality situation. The processor 30 is mounted to the frame 66 for analyzing and processing the data from the camera 32 such as by using computer vision (CV) techniques and communicating that data to each player's device 16.

The glasses 12 preferably include a built-in microphone/speaker 72 and earphone or earpiece 74. The microphone/speaker 72 permits a player 18 or 20 to speak to the other player in real time while playing the basketball game, and earpiece 74 enables the players 18 and 20 to hear what the other players are saying in response. The glasses 12 include a conventional standard transceiver 76 in order to wirelessly communicate information such as the camera images and/or other data relating to a player 18 or 20 and communicate through Bluetooth Low energy (BLE). The smart glasses 12 have a server manager code that contains functions for several different server file protocols including TCP, UDP, MIX and TLA. The file transfer functions preferably use multithreading to transfer and process the file bytes quickly and efficiently. The glasses 12 are powered such as by battery and/or electric charge.

As noted above, commercially available smart glasses can be utilized as part of the invention or, alternatively, specifically designed custom-made glasses can be designed and manufactured such as with more than one camera and faster processing speeds.

Figure 4:
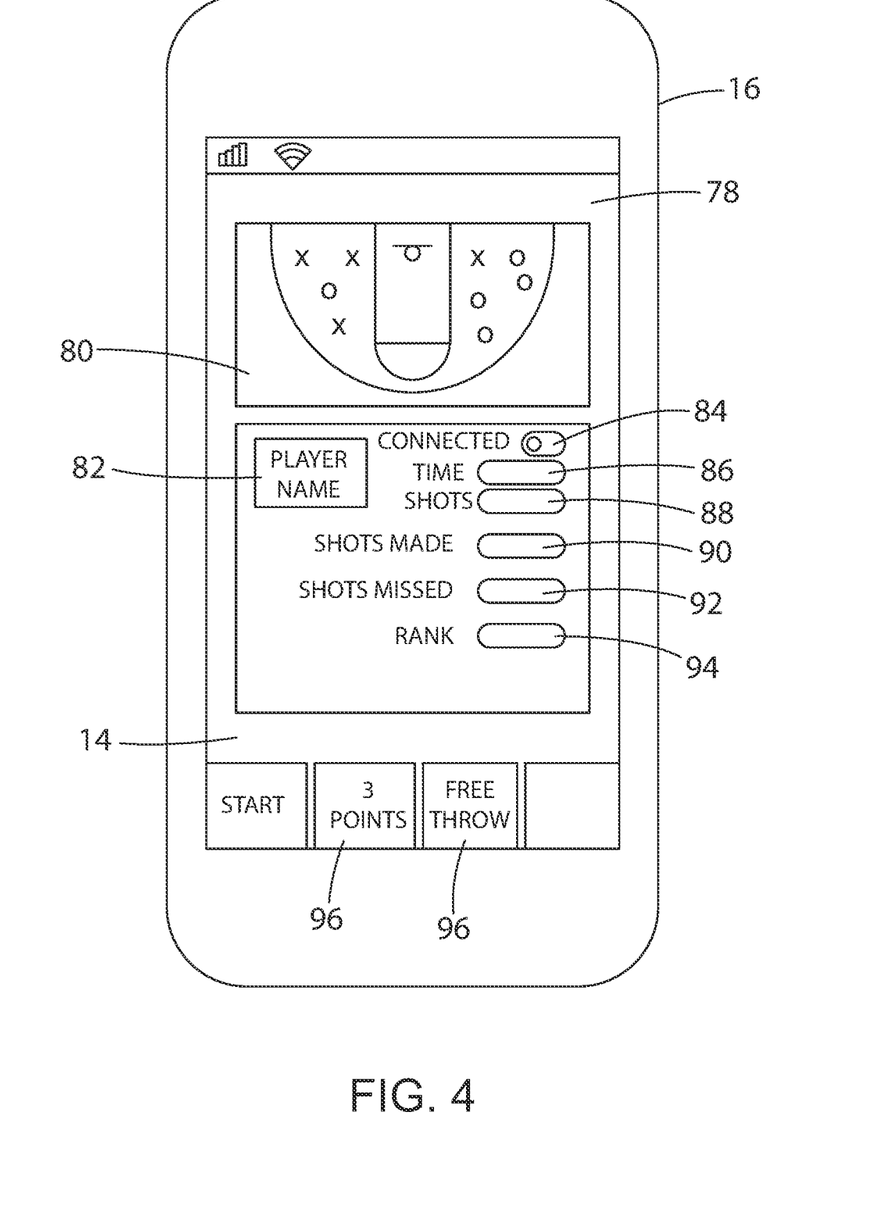
FIG. 4 is a schematic of an interface of an application of the present invention.

Turning now to FIG. 4, there is illustrated an exemplary graphical user interface 78 of the application 14 which is accessed by each player's device 16. It should be noted that the interface 78 can be designed and look differently and display different information as desired. The interface 78 includes a miniature basketball court graphic 80 where the location of each player's shots as makes/misses is shown for example by x's and o's and where the distance of a player's shots from the rim 24 can also be displayed. The player names 82 can be displayed and an indication 84 indicating that the first player 18 is connected to the second player 20, and the game is on. The interface 78 displays elapsed time 86 of the game being played, the total shots 88 attempted by the player 18 or 20, the number of makes/misses 90 and 92 of the player, and each player's rank 94 among all players that have played the selective basketball game. Each player's device 16 keeps track of a player's rank using any type of ranking system/method. A player's rank can be accessed even if the player 18 or 20 is not actively playing a basketball shooting game.

The interface 78 enables a player 18 or 20 to choose between several basketball games 96 by selecting from a predetermined menu. Games can include but are not limited to a three-point shooting game and a free throw shooting game. A player 18 or 20 can also choose to play the game with a different player.

Figure 5:
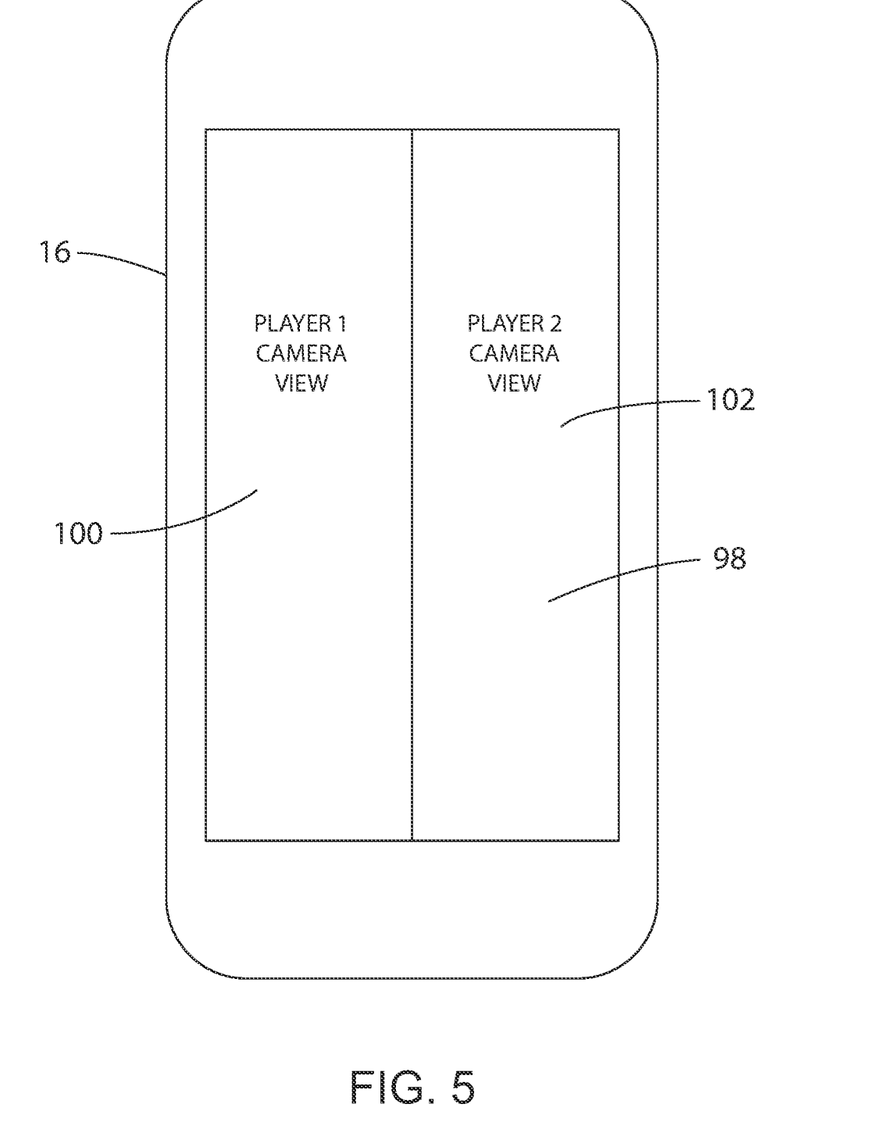
FIG. 5 is a schematic of the interface of the application.

FIG. 5 shows another graphical user interface 96 wherein there is a split screen 98 showing the camera data 100 from the first player 18 and the camera data 102 from the second player 20.

In order to utilize the smart glasses 12 for the basketball shooting game between two players 18 and 20 on remote basketball courts, processes are needed to track the players 18 and 20 and analyze the data from the glasses 12 by tracking the basketball 22, without need for any sensors on the rim 24, backboard 26 or basketball 22 which would be an impediment to playing the game.

Figure 6:
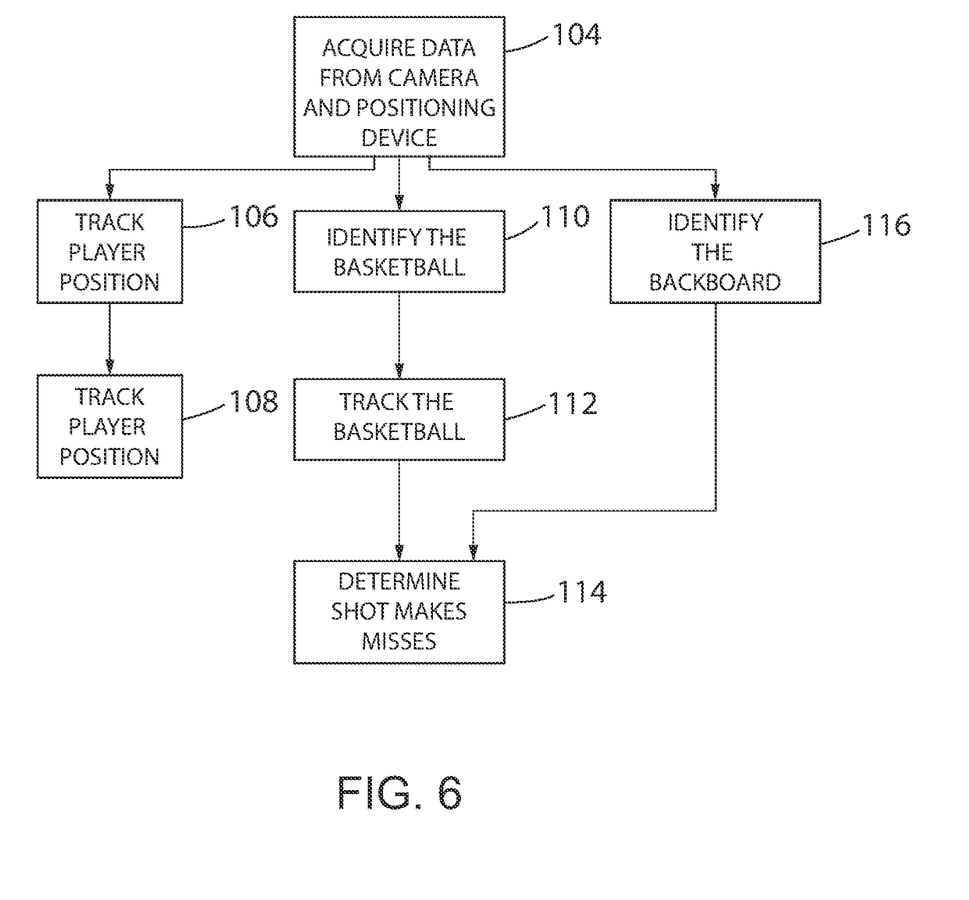
FIG. 6 is a flowchart of the data processing of the invention.

Turning now to FIG. 6, with respect to player tracking, data from the positioning device 68 on the smart glasses 12 is acquired at step 104 and utilized to determine where a player 18 or 20 is on the basketball court at step 106 and utilized to mark where a player 18 or 20 takes a shot at step 108.

With respect to tracking the basketball 22, the data streamed and acquired from the camera 32 of the smart glasses 12 is utilized as shown in step 104 to identify the basketball 22 in step 110, track the basketball 22 in step 112 and determine made and missed shots in step 114. Preferably, a tool that the system 10 uses to interpret the data streamed from the camera 32 can be sourced from OpenCV, an open source CV and machine learning software library. More specifically, an implementation of the OpenCV library made solely for use in Unity OpenCV for Unity from Enox Software can be used for tracking the basketball. Unity is advantageous to enable almost all commercially available smart glasses to be used in this game system. Filters can also be used to filter artificial data from the camera data. However, other software for processing the data from the smart glasses, whether commercially available or custom written, can also be utilized with the invention.

HoloLens World Tracking can be used to identify the basketball backboard 26 in 3d space in step 116. To accomplish this, images of backboards are preferably scanned to enable the glasses 12 to recognize backboards of different designs. Alternatively, after putting the glasses 12 on, a player 18 or 20 will be asked to shoot any number of shots, such as 3-5, until the system 10 recognizes the backboard 26 in use. If desired, the entire court could be identified by the system 10 as well.

The OpenCV plugin can be used to identify and track the basketball 22 and process the camera data while tracking the backboard's position. During the processing, the OpenCV plugin functions will analyze the frames captured from the camera 32 to identify contour lines that match the circular shape of the basketball 22 as the images featured from the frame are 2d. The processing also takes into account the size of the basketball 22, the focal length of the camera 32, the diameter of the basketball 22 and the color of the basketball 22 such as through use of the OpenCV Find Contours function. Alternatively, the system 10 can request a player 18 or 20 to place the basketball 22 in front of the smart glasses 12 until the system 10 recognizes the specific basketball that is being used in the game.

The image processing within OpenCV on the processor 30 is done in as many frames as possible in order to achieve good accuracy without slowing down the processing. In order to achieve better performance, the processing can scale the input frames down to 896×504 resolution (16:9 aspect ratio). The FOV can be kept at 48 degrees and the aspect ratio is kept the same to ensure consistent accuracy. However, it should be noted that faster processing speed, higher resolution and different aspect ratios can also be utilized as known by those of skill in the art. It should also be noted that a different processor not on the smart glasses 12 can also be used in addition to or in place of the processor 30.

The processing of the camera data also preferably detects the color of the basketball 22 and converts from RGB to HSV in order to precisely determine the color of the basketball 22 when it is in the camera frame data. Filtering is preferably done so appropriately colored round orange objects such as 0.5 miles away are not identified as the basketball 22.

Turning now to the processing of basketball shot makes/misses and FIG. 7, preferably during the start of processing of the data, collision detection boxes 118 and 120 are created in order to ensure a proper basketball shot is processed. A first collision detection box 118 is positioned above the rim 24 adjacent the backboard 26 and a second collision detection box 120 is positioned below the rim 24. The system 10 detects collisions in succession with the basketball 22 along with the two collision boxes 118 and 120 that are created to overlay the camera data. Once the system 10 detects a collision between the basketball 22 and the first collision detection box 118 then the second collision detection box 120 in that order, the system records that as a basket made. The use of the focal length of the camera 32 to determine the distance of the basketball 22 from the camera 32 ensures that there are no errors in collision detection. In the 2*d* image processing, the basketball 22 may appear to be colliding with the collision detection boxes 118 and 120 if it is in front of or behind either of the boxes 118 and 120, however, using the area of the basketball 22 when colliding with the boxes 118 and 120 ensures that no errors are made when processing.

It should also be noted that the system 10 can also provide predictive make/miss determinations if a player 18 or 20 turns their head away from the rim 24 thus not providing any camera data. In this situation, the system 10 can predict if the shot was a make/miss based on the trajectory mapping of the shot as it approaches the rim 24 with the camera data that is available.

With respect to projecting graphics and game data 62 on the display 70 of the smart glasses 12, this is known in the art through use of a combiner that works like a partial mirror to redirect the display light and selectively let in light from the real world. FIG. 7 illustrates an example of the MAKE graphic as seen on the display 70 of the glasses 12. Other graphics and/or data that could be displayed include location, temperature, and distance from the basketball rim.

In another aspect of the invention, the camera output of the glasses 12 of the players 18 and 20 can be transmitted via a network to third parties to watch the games whether they are physically at one of the basketball courts or not.

Various features and advantages of the invention are set forth in the following claims.

The invention claimed is:

1. A basketball shooting game method for at least two basketball players on basketball courts at remote locations, said method comprising:
matching up two players at remote locations that have selected to play the same basketball shooting game;
acquiring real-time camera data from smart glasses that each player wears while the players are playing the selected basketball shooting game with each player using a basketball and a hoop;
analyzing the camera data using an overlay over the camera data to determine make/miss data for each player based upon how many shots each player made and missed during the selected basketball game without using data from a sensor on the basketball and on the hoop; and
communicating the camera data and the make/miss data of one player to the other player.

2. A basketball shooting game method of claim 1 and further including the step of displaying indicia of make/miss data on each player's smart glasses.

3. A basketball shooting game method of claim 1 and further including the step of displaying augmented reality graphics relating to at least one of make/miss data, famous basketball players, fans and the basketball itself on each player's smart glasses.

4. A basketball shooting game method of claim 1 wherein in the communicating step, the camera data and the make/miss data is communicated to a player's smart device.

5. A basketball shooting game method of claim 4 wherein the smart device includes an application loaded and running thereon.

6. A basketball shooting game method of claim 1 and further including the step of determining which player won the selected basketball game and communicating that results to each player.

7. A basketball shooting game method of claim 1 wherein the smart glasses enable the players to communicate via audio with each another during the playing of the selected basketball game.

8. A basketball shooting game method of claim 1 wherein the smart glasses include a processor that performs the analyzing step.

9. A basketball shooting game method of claim 1 and further including the step of analyzing the camera data to recognize at least one of the basketball, a hoop and a backboard.

10. A basketball shooting game method of claim 1 and further including the step of analyzing the data from each player's smart glasses to determine each player's position on their basketball court.

11. A basketball shooting game method of claim 1 and further including the step of analyzing the data from each player's smart glasses to track the basketball.

12. A basketball shooting game method for at least two basketball players on basketball courts at remote locations, said method comprising:
matching up two players at remote locations that have selected to play the same basketball shooing game with each player using a ball and a hoop;
acquiring real-time camera data from smart glasses that each player wears while the players are playing the selected basketball shooting game;
analyzing the camera data using an overlay over the camera data to determine make/miss data for each player based upon how many shots each player made and missed during the selected basketball game; and
communicating the camera data and the make/miss data of one player to the other player,
wherein in the analyzing step, no data is used from additional sources.

13. A method for enabling two basketball players on basketball courts at remote locations to play a selected basketball game against one another, said method comprising:
matching up two basketball players on basketball courts at remote locations to play a selected basketball shooting game with each player using a basketball and a hoop;
transmitting real-time camera data from smart glasses worn by each player to a smart device of the other player;
analyzing the camera data from each player's smart glasses using an overlay over the camera data to determine how many shots each player made and missed during the selected basketball game without using data from a sensor on the basketball and on the hoop; and
transmitting the number of shots made and missed by each player to the other player's smart device.

14. A method of claim 13 wherein the smart glasses include a processor and wherein the processor performs the analyzing step.

15. The method of claim 13 wherein the smart device includes an application loaded and running thereon.

16. A method for enabling two basketball players on basketball courts at remote locations to play a selected basketball shooting game against one another, said method comprising:
matching up two players to play a selected basketball shooting game;
transmitting real-time camera data from smart glasses worn by each player to a smart device of the other player;
analyzing the data from each player's smart glasses to recognize a basketball, a rim and a backboard;
analyzing the data from each player's smart glasses to determine each player's position on their basketball court;
analyzing the data from each player's smart glasses to track the basketball;
analyzing the data from each player's smart glasses to determine if each shot taken by each player was a make or miss using collision volumes overlaying the real-time camera data;

displaying augmented reality information related to the selected basketball game on each player's smart glasses; and transmitting the number of shots made and missed by each player to both players smart devices.

17. A method of claim 16 wherein in the step of analyzing the data from each player's smart glasses to track the basketball, the shape of the basketball is utilized.

18. A method of claim 16 wherein in the step of analyzing the data from each player's smart glasses to track the basketball, the color of the basketball is utilized.

19. A method of claim 16 and further including the step of transmitting the camera data and shots made and missed to third parties.

20. A method for enabling two basketball players on basketball courts at remote locations to play a selected basketball shooting game against one another, said method comprising:

matching up two players to play a selected basketball shooting game;

transmitting real-time camera data from smart glasses worn by each player to a smart device of the other player;

analyzing the data from each player's smart glasses to recognize a basketball, a rim and a backboard;

analyzing the data from each player's smart glasses to determine each player's position on their basketball court;

analyzing the data from each player's smart glasses to track the basketball;

analyzing the data from each player's smart glasses to determine if each shot taken by each player was a make or miss without the need for sensors on the basketball, the rim or the backboard;

displaying augmented reality information related to the selected basketball game on each player's smart glasses; and transmitting the number of shots made and missed by each player to both players smart devices;

wherein in the step of analyzing the data from each player's smart glasses to determine if each shot made by the player was a made or miss, a collision detection box above and a collision detection box below the basketball rim are utilized to determine if shots are made or missed.

* * * * *